United States Patent

Shirotori

[11] Patent Number: 5,920,437
[45] Date of Patent: Jul. 6, 1999

[54] OBJECTIVE LENS DRIVING APPARATUS

[75] Inventor: Toshio Shirotori, Nagano, Japan

[73] Assignee: Sankyo Seiki Mfg. Co., Ltd., Nagano-ken, Japan

[21] Appl. No.: 09/070,687

[22] Filed: Apr. 30, 1998

[30] Foreign Application Priority Data

May 8, 1997 [JP] Japan .................................. 9-117771
May 28, 1997 [JP] Japan .................................. 9-138068

[51] Int. Cl.$^6$ ........................................................ G02B 7/02
[52] U.S. Cl. ............................ 359/824; 359/814; 369/44.14
[58] Field of Search .................................. 359/813, 814, 359/824; 369/44.14

[56] References Cited

U.S. PATENT DOCUMENTS

| | | | |
|---|---|---|---|
| 4,817,076 | 3/1989 | Van Sluys et al. ................... | 359/814 |
| 4,861,138 | 8/1989 | Suzuki .................................. | 359/814 |
| 4,998,802 | 3/1991 | Kasuga et al. ....................... | 359/814 |
| 5,105,405 | 4/1992 | Hashimoto et al. .................. | 359/814 |
| 5,317,552 | 5/1994 | Yamasaki ............................. | 359/44.14 |
| 5,388,086 | 2/1995 | Yamasaki et al. ................... | 369/44.14 |
| 5,506,732 | 4/1996 | Mori ..................................... | 359/824 |
| 5,513,047 | 4/1996 | Matsui .................................. | 359/824 |

*Primary Examiner*—Loha Ben
*Attorney, Agent, or Firm*—McAulay Nissen Goldberg Kiel & Hand, LLP

[57] ABSTRACT

An objective lens driving apparatus comprises a lens holder supporting an objective lens, a support shaft which enables the lens holder to be contactingly movable in the focusing direction and rotatable in the tracking direction, a driving coil for focusing and a driving coil for tracking which are mounted on the outer surface of the lens holder in the circumference direction, an outer yoke which is positioned opposite from the outer surface of the lens holder and first and second arched magnets which are mounted on the inner surface of the yoke in the circumference direction. The driving coil for focusing is a hollow coil which is positioned such that its hollow core lies in the focusing direction wherein an inner yoke mounted on the outer yoke passes through the hollow core. The driving coil for tracking being a hollow coil which is positioned such that its hollow faces from the outer surface of the lens holder to the inner surface of the outer yoke.

13 Claims, 5 Drawing Sheets

OBJECTIVE LENS DRIVING APPARATUS

BACKGROUND OF THE INVENTION a) Field of the Invention

The present invention relates to an objective lens driving apparatus which is assembled into an optical head apparatus for regeneration of optical recording media and the like, in particular, it relates to an objective lens driving apparatus which can be structured thinner and a method of manufacturing it.

b) Description of the Related Art

U.S. Pat. No. 4,998,802 is an example of an objective lens driving apparatus which is assembled into an optical head apparatus wherein the apparatus comprises a lens holder to support an objective lens and a magnetic driving circuit to move the lens holder in the focusing direction and the tracking direction.

The structure of this objective lens driving apparatus is called a contactingly movable axis type in which the lens holder is moved along a support shaft in the focusing direction and the lens holder is rotated around the support shaft in the tracking direction.

A magnetic driving circuit to move the lens holder described above comprises a magnetic driving circuit for focusing to contactingly move the lens holder along the support shaft in the focusing direction and a magnetic driving circuit for tracking to rotate the lens holder around the support shaft in the tracking direction.

The magnetic driving circuit for focusing is structured such that a pair of driving coils for focusing is mounted on the outer surface of the lens holder to be symmetric around the support shaft and a pair of magnets for focusing is mounted on the inner surface of an outer yoke, which is formed to surround the outer surface of the lens holder, such that the magnets lay opposite from the driving coils.

In a similar manner, the magnetic driving circuit for tracking is structured such that a pair of driving coils for tracking is mounted on the outer surface of the lens holder to be symmetric around the support shaft and a pair of magnets for tracking is mounted on the inner surface of an outer yoke, which is formed to surround the outer surface of the lens holder, such that the magnets lay opposite from the driving coils.

Flat hollow coils adhered to the outer surface of the lens holder are used as the driving coils which comprise these magnetic driving circuits. Also, the magnets for tracking opposite from the hollow coils for tracking are magnetized in the tracking direction, that is the direction of the circumference of the outer yoke. On the other hand, the magnets for focusing opposite from the hollow coils for focusing are magnetized in the focusing direction, that is the direction of the height of the outer yoke.

Additionally, in the objective lens driving apparatus of the contactingly movable axis type described above, the support shaft is formed of a metal and the like since the lens holder contactingly moves along the support shaft during driving; on the other hand, the whole lens holder is often formed of a resin material, such as polyphenylensulfide and the like, which has excellent contactingly movable characteristics. Also, a lens mounting portion is formed on the lens holder such that an objective lens can be horizontally mounted thereon. A reference surface for horizontal extension of the objective lens is formed at the lens mounting portion such that the objective lens is perpendicular to the support shaft. A flat flange portion of the objective lens contacts the reference surface such that the mounting position of the objective lens is determined. Therefore, the lens holder is designed such that the reference surface for horizontal extension of the objective lens is perpendicular to the axial line of the bearing hole.

Recently, along with demands for miniaturizing optical head apparatus, miniaturizing, and particularly, flattening of objective lens driving apparatus to be assembled therein is demanded.

In order to flatten an objective lens driving apparatus of the contacting movable axis type while maintaining a movable range of the objective lens in the focusing direction, the thickness of the lens holder needs to be thinner. In this case, it is necessary to replace the flat hollow coils for focusing and tracking adhered on the outer surface of the lens holder with smaller ones. However, application of smaller flat hollow coils lowers magnetic driving characteristics of the magnetic driving circuit. Hence, it has been difficult to flatten conventional objective lens driving apparatus of the contactingly movable axis type.

Moreover, in order to speed up pickup motion in the above objective lens driving apparatus by driving the lens holder at high speed, it is necessary to accomplish lightening and rigidifying the lens holder and to shift the higher resonant frequency of the lens holder to a higher range. However, a conventional lens holder is made of resin to increase contactingly movable performance of the bearing hole; thus, it is difficult to rigidify it. As a result, rigidity is increased by arranging the shape of the lens holder, such as thickening each part and forming a plurality of ribs. Nonetheless, complication of the lens holder shape makes difficult to flatten the lens holder; in addition, lowering of precision may result due to sinks of resin during resin formation. If precision in formation is lowered, essential performance of the objective lens driving apparatus is lowered. For example, the bearing hole cannot be accurately formed such that movement of the lens holder becomes rough; in addition, the axial line of the bearing hole cannot be accurately held at a perpendicular angle to the reference surface for horizontal extension of the objective lens such that the objective lens slants in relation to the support shaft. Therefore, it is not possible to accomplish both rigidifying the lens holder and increasing contactingly movable performance of the bearing hole in the conventional objective lens driving apparatus. If the shape of the lens holder becomes too complicated in order to improve these characteristics, it is problematic that miniaturizing and flattening of the lens holder are not accomplished and that the essential performance of the objective lens driving apparatus is impaired.

OBJECT AND SUMMARY OF THE INVENTION

Considering the above issues, the primary object of the present invention is to provide an objective lens driving apparatus which can be structured thinner without lowering the magnetic driving characteristics of magnetic driving circuits for driving an objective lens.

Also, the present invention intends to provide an objective lens driving apparatus in which, both the rigidity of a lens holder and the contactingly movable performance of a bearing are increased without failing to miniaturize/flatten the lens holder or impairing essential performances of the objective lens driving apparatus, and to provide a method of manufacturing it.

In accordance with the invention, an objective lens driving apparatus comprises a lens holder supporting an objective lens, a support shaft which enables the lens holder to be contactingly movable in the focusing direction and rotatable in the tracking direction, a driving coil for focusing and a driving coil for tracking which are mounted on the outer surface of the lens holder in the circumference direction, an outer yoke which is positioned opposite from the outer surface of the lens holder and first and second arched magnets which are mounted on the inner surface of the yoke in the circumference direction. The driving coil for focusing is a hollow coil which is positioned such that its hollow core lies in the focusing direction wherein an inner yoke mounted on the outer yoke passes through the hollow core. The driving coil for tracking being a hollow coil which is positioned such that its hollow faces from the outer surface of the lens holder to the inner surface of the outer yoke.

DESCRIPTION OF THE PREFERRED EMBODIMENTS

Figure 1:
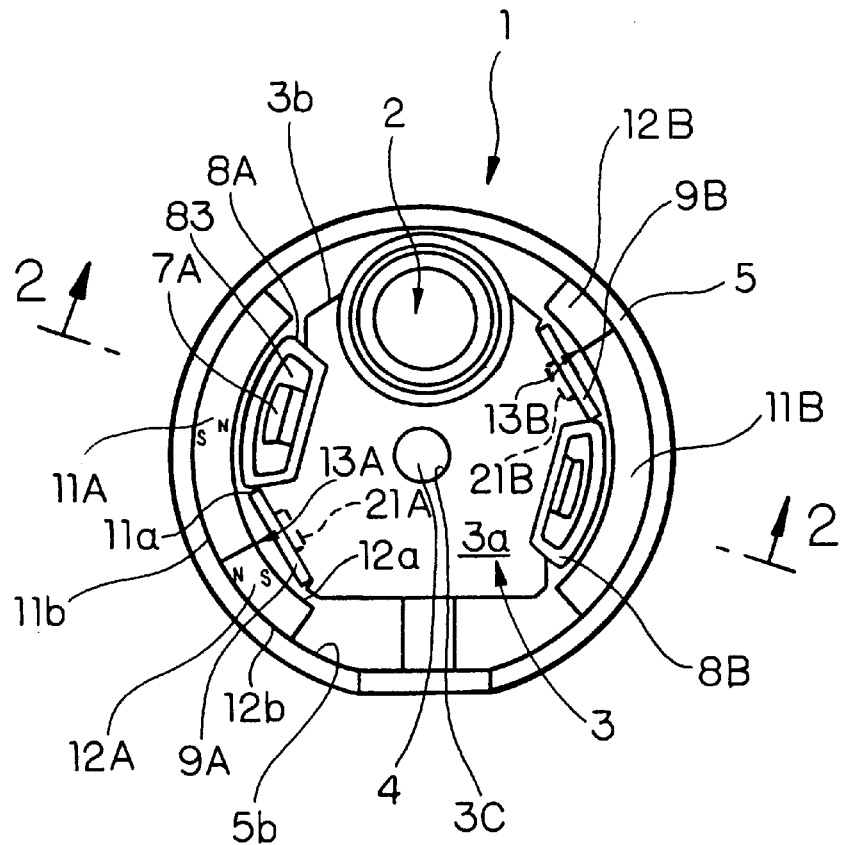
FIG. 1 is a schematic plane view of a main part of an objective lens driving apparatus of the present invention.
Figure 2:
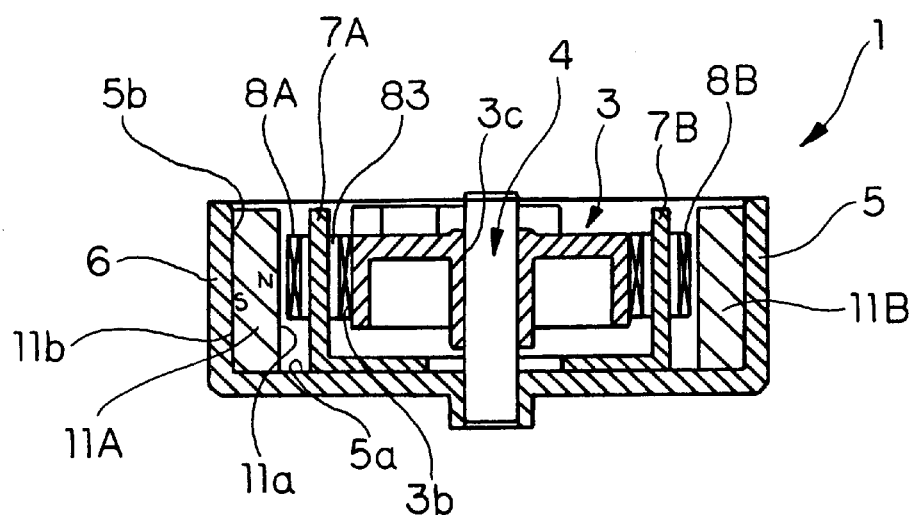
FIG. 2 is a schematic cross section of FIG. 2 at the line between II and II.
Figure 3:
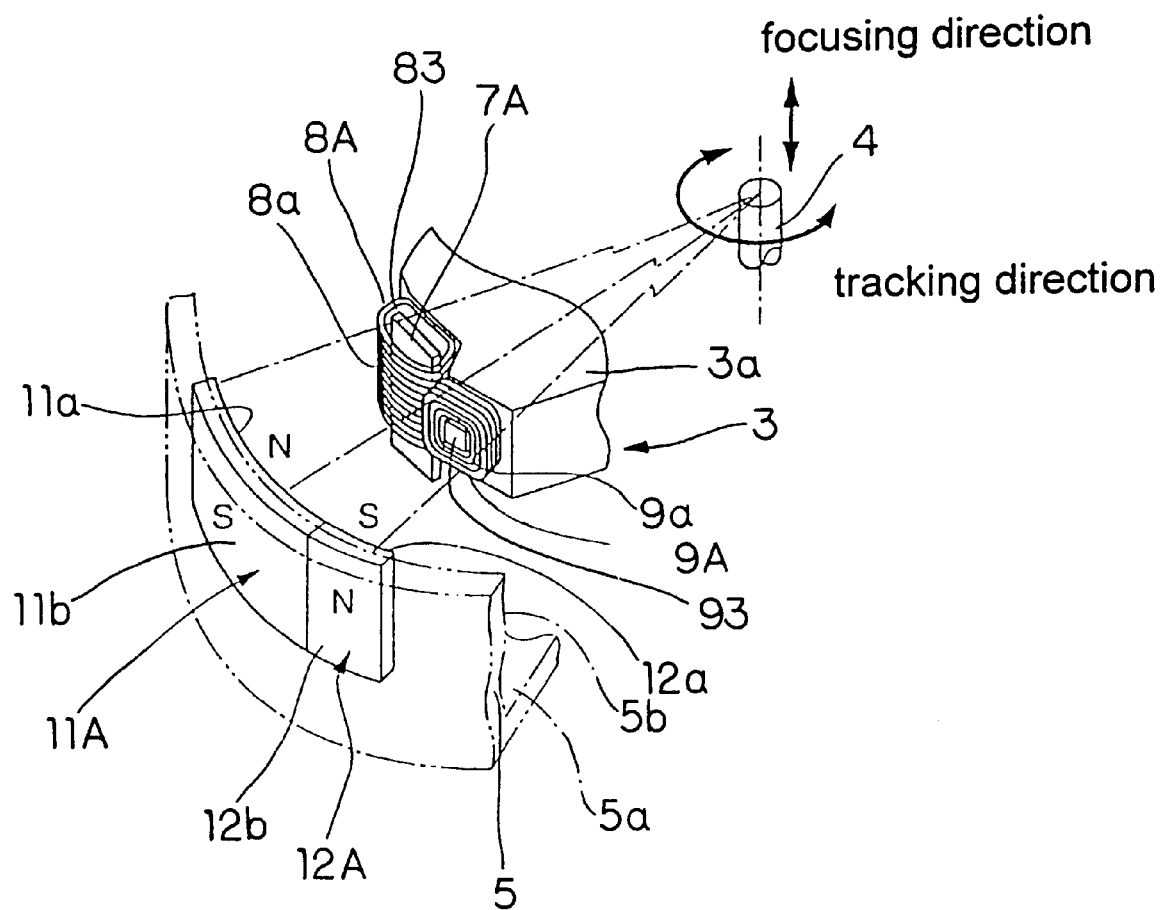
FIG. 3 shows a positional relationship between driving coils and magnets which comprise the magnetic driving circuit of FIG. 1.

The following describes an objective lens driving apparatus, to which the present invention is applied, in reference to FIGS. 1 through 3. FIG. 1 is a schematic plane view of a main part of the objective lens driving apparatus. FIG. 2 is a schematic cross section of the above part at the line between II and II. FIG. 3 shows a positional relationship between driving coils and magnets which compose a magnetic driving circuit.

According to FIGS. 1 and 2, objective lens driving apparatus 1 is a contactingly movable axis type in which lens holder 3 supporting objective lens 2 is contactingly movable in the focusing direction along support shaft 4 and rotatable in the tracking direction around support shaft 4. Lens holder 3 comprises top 3a, onto which objective lens 2 is mounted, and outer surface 3b, which extends downward from the periphery of top 3a. At the center of lens holder 3, shaft hole 3c, into which support shaft 4 is inserted, is formed.

Outer yoke 5, onto which support shaft 4 is mounted, is formed of a magnetic material and comprises bottom 5a and outer yoke wall 5b which surrounds outer surface 3b of lens holder 3 extending upward from the periphery of bottom 5a. As explained hereafter, a magnetic driving circuit for focusing, which moves lens holder 3 in the focusing direction, and a magnetic driving circuit for tracking, which rotates lens holder 3 in the tracking direction, are formed between outer yoke 5 and lens holder 3.

Driving coil for focusing 8A and driving coil for tracking 9A are mounted adjacent to each other in the circumference direction on outer surface 3b of lens holder 3. On the other hand, arcuate first and second magnets 11A, 12A are mounted adjacent to each other in the circumference direction on outer yoke wall 5b.

Driving coil for focusing 8A is a hollow coil which is placed such that hollow core 83 faces in the focusing direction. For example, it can be like a voice coil found on the diaphragm of a speaker. Inner yoke 7A is inserted in hollow core 83 of driving coil for focusing 8A. Inner yoke 7A is a plate made of a magnetic material which perpendicularly stands on bottom 5a of outer yoke 5. On the contrary, driving coil 9A for tracking is a flat hollow coil which is placed such that hollow core 93 extends from lens holder outer surface 3b to outer yoke wall 5b (shown in FIG. 3).

On the other hand, first magnet 11A mounted on outer yoke 5 is magnetized such that its inner surface 11a and outer surface 11b are magnetic pole surfaces; in this embodiment, inner surface 11a is the N magnetic pole and outer surface 11b is the S magnetic pole. Similarly, second magnet 12A is magnetized such that its inner surface 12a and outer surface 12b are magnetic pole surfaces; however, on the contrary from first magnet 11, inner surface 12a is the S magnetic pole and outer surface 12b is the N magnetic pole.

The following describes, in reference to FIG. 3, positional relationships among driving coil for focusing 8A and driving coil for tracking 9A formed on lens holder 3 and first and second magnets 11A, 12A formed on outer yoke wall 5b. First magnet 11A is designed such that the length of inner surface 11a in the circumference direction is appropriately longer than the length of outer surface 8a of driving coil for focusing 8A. Also, outer surface 8a of driving coil for focusing 8A lies opposite from inner surface 11a of first magnet 1A while being embraced.

On the other hand, a half of outer surface 9a of driving coil for tracking 9A lies opposite from inner surface 11a of first magnet 11A and the remaining lies opposite from inner surface 12a of second magnet 12A. As a result, one side of driving coil for tracking 9A in the circumference direction lies opposite from the N magnetic pole of first magnet 11A and the other side lies opposite from the S magnetic pole of second magnet 12A.

Therefore, a magnetic driving circuit for focusing is formed of driving coil for focusing 8A and first magnet 11A, which are lie opposite from each other. Also, a magnetic driving circuit for tracking is formed of driving coil for tracking 9A and first and second magnets 11A, 12A.

As obvious from FIGS. 1 and 2, the magnetic driving circuit for focusing and magnetic driving circuit for tracking of the above structures are also structured to be positioned point-symmetric around support shaft 4. That is, driving coil for focusing 8B and driving coil for tracking 9B, which have the shape and structure same as coils 8A, 9A, are mounted on outer surface 3b of lens holder 3. Also, first and second magnets 11B, 12B, which have the shape and structure same as first and second magnets 11A, 12A, are mounted on outer yoke wall 5b. The positional relationships among the above are similarly designed.

In objective lens driving apparatus 1, the magnetic driving circuit for focusing, which requires a larger driving force compared to the one necessary in the tracking direction, is structured with driving coil 8A which is mounted on lens holder 3 such that hollow core 83 faces in the focusing direction. Therefore, compared to a magnetic driving circuit is structured with flat hollow coil 9A which is used in a conventional magnetic driving circuit for tracking, magnetic fluxes can be effectively utilized since there is no hollow core on outer surface 8a of driving coil for focusing 8A. In addition, an expected magnetic driving force for focusing can be obtained even by using a short coil as the above driving coil BA by making lens holder 3 thinner. Therefore, flattening of an objective lens driving apparatus can be easily accomplished.

Also, in objective lens driving apparatus 1, the magnetic driving circuit for tracking is structured such that driving coil for tracking 9A bridges over first and second magnets 11A, 12A, which are magnetized on their inner and outer surfaces. As described above, first magnet 11A, which comprises the magnetic driving circuit for focusing, is also utilized for the magnetic driving circuit for tracking, therefore, the magnetic driving circuits can be miniaturized. As a result, miniaturization of the objective lens driving apparatus is accomplished.

Furthermore, it is advantageous that magnetizing both sides of the magnet is easier than magnetizing one surface for polarization.

In objective lens driving apparatus 1, first and second magnets 11A, 12A are separate magnets; however, it is possible to form a combined magnet. In this case, one side of the inner surface in the circumference direction is magnetized the same as the first magnet, and the other side is magnetized same as the second magnet.

Moreover, in objective lens driving apparatus 1, a neutral position maintaining means to maintain lens holder 3 at a neutral position in a nondriving condition can be easily structured as follows. Magnetic piece 21A can be mounted at a position on outer surface 3a of lens holder 3, which is across from border portion 13A of first and second magnets 11A, 12A, as indicated by an imaginary line in FIG. 1. Similarly, magnetic piece 21B can be mounted at a position, which is across from border portion 13B of first and second magnets 11B, 12B, as indicated by an imaginary line.

The following describes an embodiment of an objective lens driving apparatus in which high rigidity of the lens holder and high contactingly movable performance of the bearing of the present invention are obtained.

Figure 4:
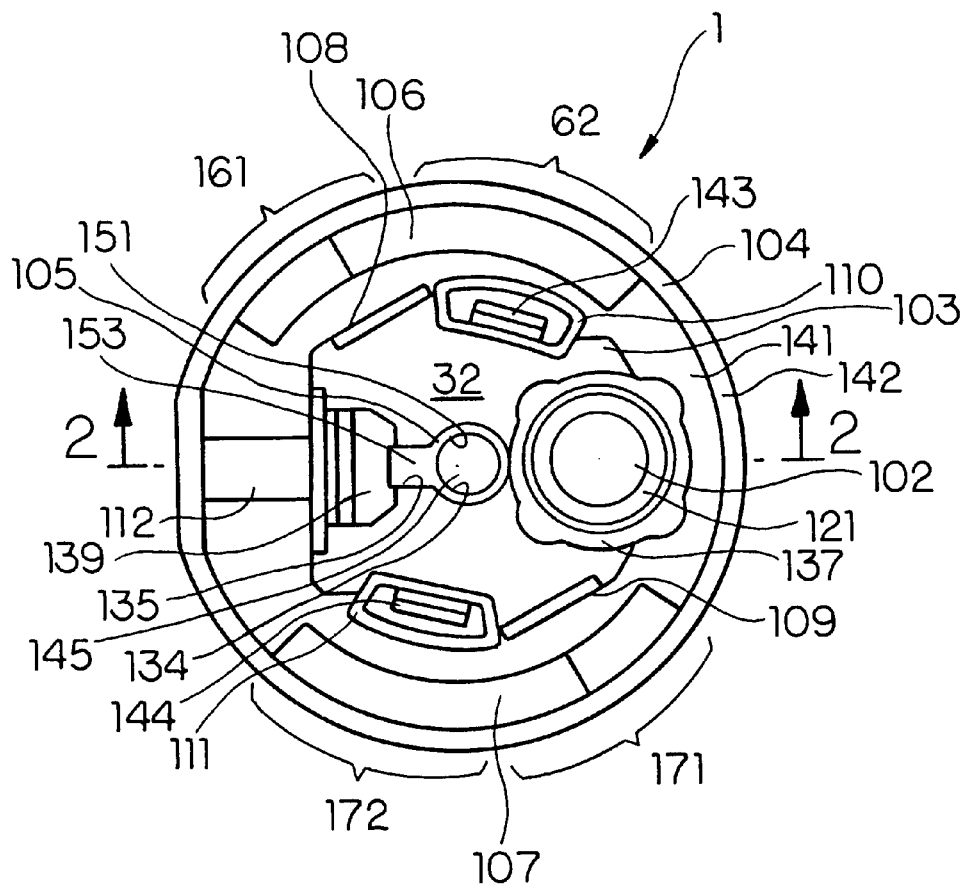
FIG. 4 is a plane view of an objective lens driving apparatus of the present invention.
Figure 5:
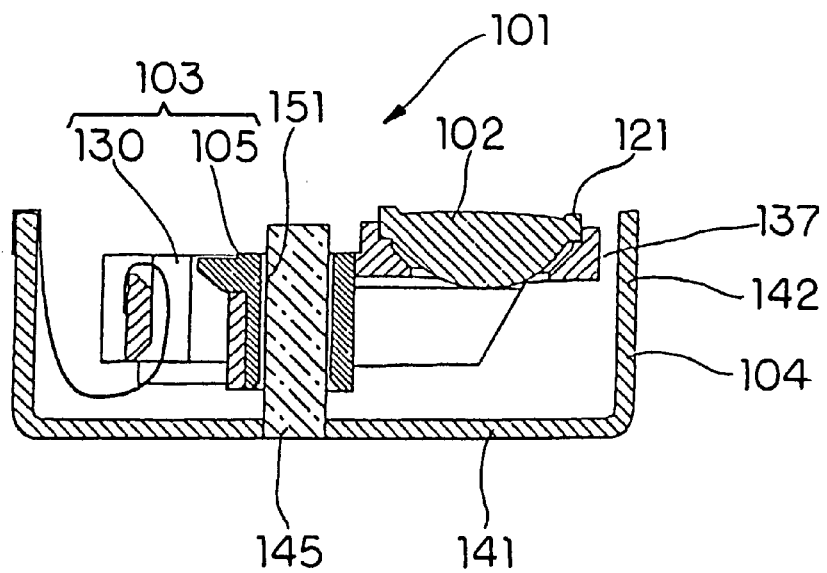
FIG. 5 is a cross section of the apparatus shown FIG. 4 at the line between II and II.

FIG. 4 is a plane view of an objective lens driving apparatus described in this embodiment of the present invention. FIG. 5 is a cross section of the objective lens driving apparatus in FIG. 4 at the line between II and II.

The objective lens driving apparatus of the present invention has a structure essentially same as objective lens driving apparatus shown in the above FIGS. 1 through 3; therefore, detailed descriptions are to be omitted.

As shown in FIGS. 4 and 5, objective lens driving apparatus 101 comprises lens holder 103, which supports objective lens 102 at objective lens mounting portion 137 and holder supporting member 104, which supports lens holder 103.

Holder supporting member 104 comprises round bottom 141, cylindrical outer yoke 142 which perpendicularly extends from the periphery of bottom 141, a pair of inner yokes 143, 144 which are formed by cutting out a part of bottom 141 to stand straight up and holder support shaft 145 which stands perpendicularly from the center of bottom 141.

Inner yokes 143, 144 are occasionally mounted as separate parts instead of cutting out a part of bottom 141.

Lens holder 103 comprises bearing hole 134 into which support shaft 145 is inserted. Hence, lens holder 103 is supported by holder supporting member 104 to be movable in the direction of axial line 146 of support shaft 145 and to be rotatable around axial line 146. A magnetic circuit for tracking, which rotates lens holder 103 around axial line 146 of support shaft 145, and a magnetic circuit for focusing, which moves lens holder 103 in the direction of axial line 146 along support shaft 145, are formed between lens holder 103 and holder supporting member 104.

The magnetic circuit for tracking and the magnetic circuit for focusing comprise a pair of driving coils for tracking 108,109 which are mounted on the outer surface of lens holder 103, a pair of driving coils for focusing 110, 111 and first and second magnets 106, 107 which are mounted on the inner surface of outer yoke 142 across from the above driving coils.

Figure 6:
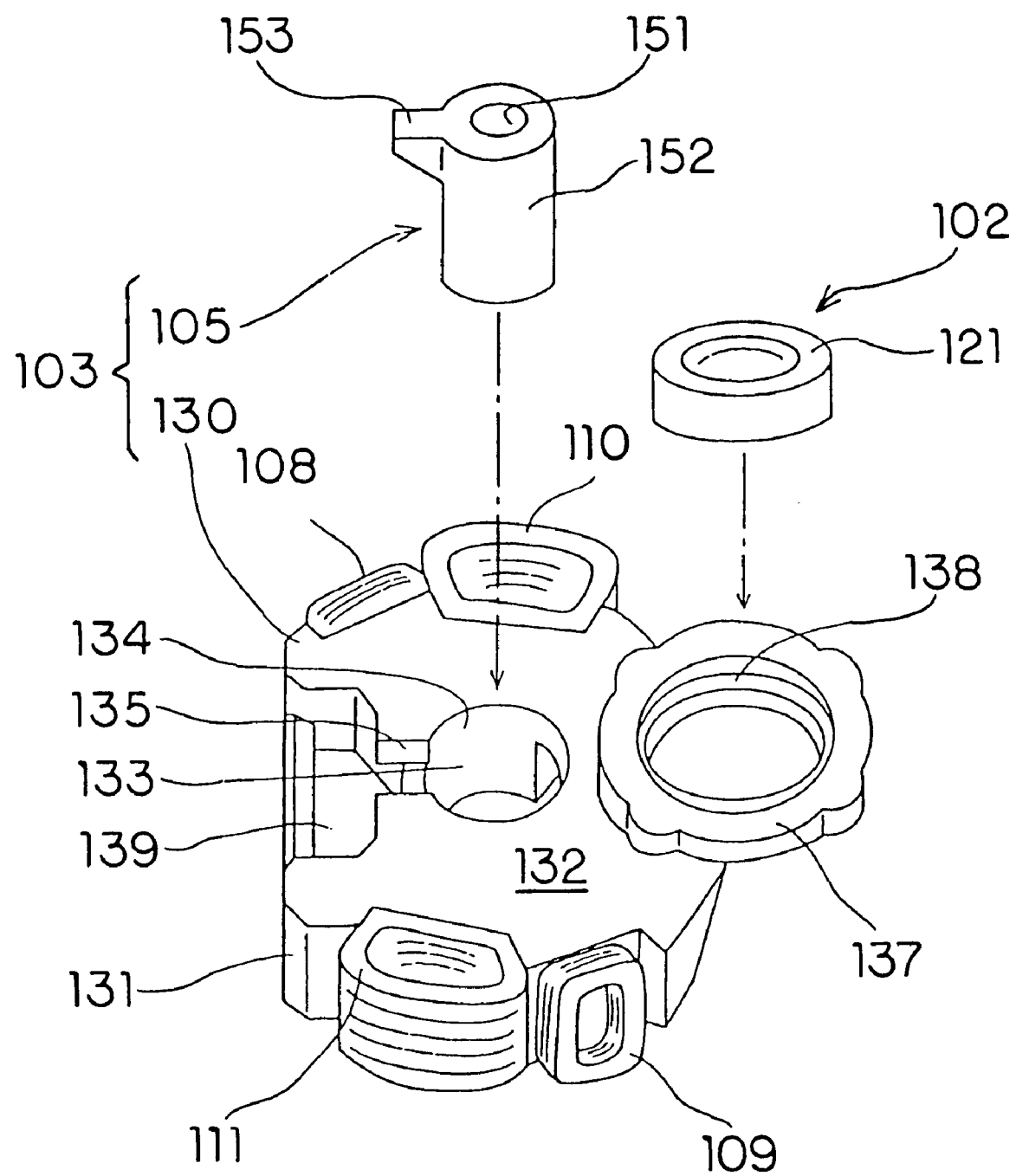
FIG. 6 is a perspective view of the apparatus shown FIG. 4 from the oblique top.

FIG. 6 is a perspective view of lens holder 103 from the oblique top. In reference to this figure, first and second driving coils for tracking 108, 109 have a flat form with a vertical cross section which is semi-rectangular; one side is adhered to the outer surface of lens holder 103. First and second driving coils for focusing 110, 111 have a horizontal cross section which is semi-rectangular and extend in the direction of axial line 146 of support shaft 145; its outer surface is adhered to the outer surface of lens holder 103. Driving coils for focusing 110,111 are hollow coils in which, as shown in FIG. 4, inner yokes 143, 144 are placed in the hollow core.

First and second magnets 106,107 are magnetized such that they are polarized in the circumference direction from the portion, which lies across from driving coils for tracking 108, 109, as a center. First and second magnets 106, 107 are magnetized such that the portions across from driving coils for focusing 110, 111 are magnetized to one magnetic pole; these portions are first and second driving magnet portions for focusing 162,172. Hence, by controlling power supply to each of driving coils 108, 109, 110, 111 via FPC substrate 112, lens holder 103 can be driven in the tracking direction (rotation around axial line 146 of support shaft 145) and in the focusing direction (movement in the direction of axial line 146 along support shaft 145). Also, magnets 106, 107 can be divided into two at the line of polarization.

Figure 7:
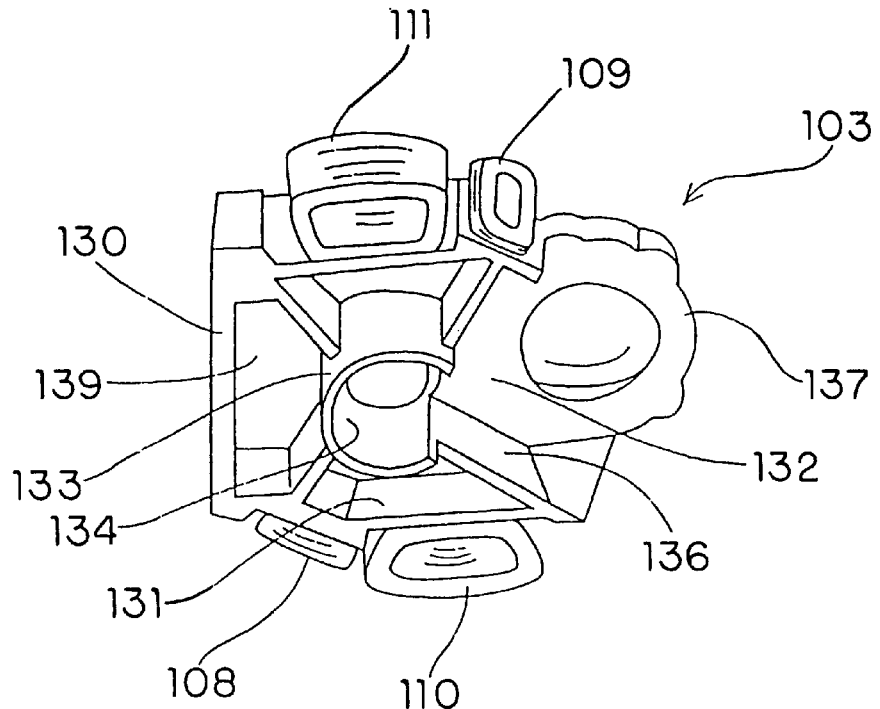
FIG. 7 shows a perspective view of the apparatus shown FIG. 4 from the oblique bottom.

FIG. 7 shows a perspective view of lens holder 103 from the oblique bottom. As shown in FIGS. 6 and 7, lens holder 103 comprises holder body 130 (lens holding body) comprising objective lens mounting portion 137 to which objective lens 102 is mounted and bearing member 105 which comprises bearing hole 151.

Holder body 130 is formed of a magnesium body, and bearing member 105 is formed of a resin body. Holder body 130 comprises cylindrical trunk 131 to which driving coil 108, 109, 110, 111 is mounted on its outer surface and top plate 132 which is formed such that it seals the top surface of trunk 131. Ring-shaped objective lens mounting portion 137 is formed on top plate 132. On the inner surface of objective lens mounting portion 137, reference surface for horizontal extension 138 to horizontally extend objective lens 102 while objective lens 102 is mounted thereon is circularly shaped. The mounting position of objective lens is determined by having flat flanging portion 121 of objective lens 102 contact the reference surface for horizontal extension 138.

Cylinder portion 133, which pierces through holder body 130 in the vertical direction, is formed; its inside is bearing mounting hole 134 to mount bearing member 105 therein. Cylindrical portion 133 and trunk portion 131 are connected by rib 136 for reinforcement. Notch 135 is formed on top plate 132 from bearing mounting hole 134 to outside. Also, notch 135 continues to opening 139 to pull out FPC substrate 112.

Bearing member 105 is a resin formation product, such as polyphenylensulfide, which is formed in a cylinder; its inside is bearing hole 151. Projection 153 is formed on the upper end of bearing member 105 such that it projects from outer surface 152. When bearing member 105 is engaged into the inside of cylinder portion 133 of holder body 130 (bearing mounting hole 134), projection 53 of bearing member 105 is engaged in notch 135 of holder body 130 to determine approximate positions.

The formed magnesium body is not limited to formed bodies of magnesium only; formed bodies of magnesium alloys containing other metals may be used.

Figure 8:
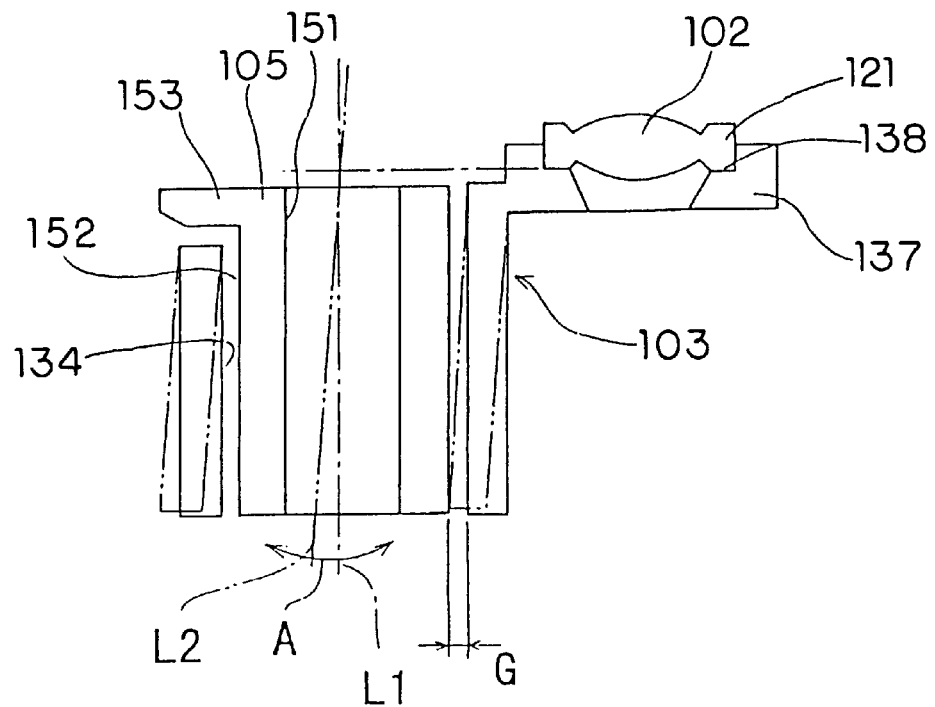
FIG. 8 explains how a bearing member is mounted on a holder body in the apparatus shown FIG. 4.

FIG. 8 explains how bearing member 105 is mounted on holder body 130. In reference to this figure, the following explains a process of assembling lens holder 103 in a method of manufacturing objective lens driving apparatus 101.

Holder body 130 and bearing member 105 are separately formed as described above; bearing member 105 is mounted in bearing mounting hole 134 of holder body 130. The inside diameter of bearing mounting hole 134 is formed larger than the outside diameter of bearing member 105. As a consequence, when bearing member 105 is inserted in bearing mounting hole 134, space G is observed between the two parts. By utilizing space G, the slant of bearing member 105 is adjusted such that axial line L1 of bearing hole 151 formed on bearing member 105 is perpendicular to the reference surface for horizontal extension 138.

In other words, by structuring holder body 130 and bearing member 105 as separate pieces, as indicated with a double dotted line in FIG. 8, axial line L1 of bearing hole 151 slants in relation to reference surface for horizontal extension 138 of lens mounting portion 137 when bearing member 105 is perfectly aligned to the axis of bearing mounting hole 134 in spite of the fact that axial line L2 of bearing mounting hole 134 formed on holder body 130 slants in relation to the reference surface for horizontal extension 138. In the present invention, however, due to space G between outer surface 152 of bearing member 105 and the inner surface of bearing mounting hole 134, it is possible to swing bearing member 105 in bearing mounting hole 134, as indicated by arrow A, when bearing member 105 is mounted on holder body 130. Therefore, after adjusting the slant of bearing member 105, bearing member 105 is fixed to bearing mounting hole 134 with an adhesive such that axial line L1 of bearing hole 151 is perpendicular to the reference surface for horizontal extension 138.

In the above embodiment, support shaft 145 and bearing member 105 are formed of metal and resin, respectively; however, one is not limited to metal and resin as long as the materials have high contactingly movable performances.

As described above, an objective lens driving apparatus of the present invention is such that a driving coil for focusing and a driving coil for tracking are mounted on the outer surface of a lens holder to be adjacent to each other, first and second magnets are mounted on the inner surface of an outer yoke to be adjacent to each other in the circumference direction and the driving coil for focusing is a hollow coil which is positioned such that its hollow core faces in the focusing direction wherein the hollow core is pierced with an inner yoke mounted on the outer yoke.

In addition to this, the driving coil for tracking is a hollow core which is positioned such that its hollow core faces in the direction from the outer surface of the lens holder to the outer yoke wall.

Therefore, according to the present invention, a magnetic driving circuit for focusing is formed of the driving coil for focusing and the first magnet wherein driving coil for focusing is a hollow coil positioned such that its hollow core faces in the focusing direction. Hence, magnetism of the driving circuit is effectively used; also, expected characteristics of magnetic driving for focusing can be easily obtained even when the thickness of the lens holder mounted thereon is made thinner to shorten the length of the hollow coil. Consequently, according to the present invention, it is accomplished that the objective lens driving apparatus can be flattened by making the lens holder thinner.

Also, as described above, in the objective lens driving apparatus of the present invention, rigidity of the whole lens holder can be increased without a complexly shaped holder body due to the fact that the whole holder body, which comprises a lens mounting portion of the lens holder, is made of a formed magnesium body. Therefore, pickup motion is sped up by shifting the higher resonant frequency of the lens holder to a higher range such that the lens holder can be driven at a high speed. In addition, the lens holder can be miniaturized and flattened since the holder body does not have to have a complex shape; at the same time, essential performances of an optical pickup apparatus can be maintained since the formation precision of the holder body is high. Moreover, in spite of the rigidity of the holder body, it is a formed magnesium body which is lighter than aluminum and other metals.

Furthermore, since it is a formed magnesium body, the holder body can be made by press-forming of powder magnesium, thus, formation precision is high. In the case of press-formation of the powder, it is advantageous that, unlike die-casting, a secondary processing is not needed.

Moreover, since the contactingly movable surface of the lens holder is formed of a resin bearing member, the contactingly movable performance between the support shaft and the bearing hole remains high even though the holder body is made of the magnesium body in order to increase rigidity.

Additionally, the bearing member is a cylinder, a simple shape, such that formation precision is high; therefore, the precision of the bearing hole is high compared to when the entire lens holder is formed as one piece. As a result, the pickup performance improves by eliminating a slant of the objective lens to the support shaft and hysteresis.

Also, the inside diameter of the bearing mounting hole is larger than the outside diameter of the bearing member; therefore, by using a space therein, high precision for assembly is obtained for separately formed side of the lens mounting portion (holder body) and the side of bearing hole (bearing member). As a result, vertical extension between the axial line of the bearing hole and the reference surface for horizontal extension can be precisely performed even though the holder body and the bearing member are separately formed since they are made of different materials according to each function. Hence, a slant of the objective lens to the support shaft is eliminated such that the pickup performance is improved.

In addition to the above, by using an adhesive to fix the bearing member to the bearing mounting hole, it is meant that the lens holder is structured with a composite material composing a plurality of materials of different elasticity. Therefore, it is advantageous that a phase confusion of the lens holder can be suppressed by a functioning anti-vibration effect.

While the foregoing description and drawings represent the preferred embodiments of the present invention, it will be obvious to those skilled in the art that various changes and modifications may be made therein without departing from the true spirit and scope of the present invention.

What is claimed is:

1. An objective lens driving apparatus comprising:
   a lens holder supporting an objective lens;
   a support shaft which enables said lens holder to be contactingly movable in the focusing direction and rotatable in the tracking direction;
   a driving coil for focusing and a driving coil for tracking which are mounted on the outer surface of said lens holder in the circumference direction;
   an outer yoke which is positioned opposite from the outer surface of said lens holder;
   first and second arched magnets which are mounted on the inner surface of said yoke in the circumference direction;
   said driving coil for focusing being a hollow coil which is positioned such that its hollow core lies in the focusing direction wherein an inner yoke mounted on said outer yoke passes through said hollow core; and
   said driving coil for tracking being a hollow coil which is positioned such that its hollow core faces from the outer surface of said lens holder to the inner surface of said outer yoke.

2. The objective lens driving apparatus according to claim 1 wherein:
   a magnetic driving circuit for focusing is structured with said driving coil for focusing and said first magnet; and
   a magnetic driving circuit for tracking is structured with said driving coil for tracking and said first and second magnets.

3. The objective lens driving apparatus according to claim 2 wherein:
   said first and second magnets are magnetized such that their inner surfaces and outer surfaces are magnetic pole surfaces which have opposite polarities from each other;
   the outer surface of said driving coil for focusing lies opposite from the inner surface of said first magnet; and
   the half of the outer surface of said driving coil for tracking in the circumference direction lies opposite from the inner surface of said first magnet and another half lies opposite from the inner surface of said second magnet.

4. The objective lens driving apparatus according to claim 1, wherein said lens holder having a magnetic piece which is attached to said lens holder to maintain said lens holder at a neutral position wherein said magnetic piece is placed opposite from the border between said first and second magnets.

5. The objective lens driving apparatus according to claim 1 wherein:
   said lens holder is structured with a holder body which comprises said lens mounting portion and which is formed of a magnesium body; and
   the inner surface of said bearing hole is structured with contactingly movable material.

6. The objective lens driving apparatus according to claim 5 wherein:
   a magnetic driving circuit for focusing is structured with said driving coil for focusing and said first magnet; and
   a magnetic driving circuit for tracking is structured with said driving coil for tracking and said first and second magnets.

7. The objective lens driving apparatus according to claim 6 wherein:
   said first and second magnets are magnetized such that their inner surfaces and outer surfaces are magnetic pole surfaces which have opposite polarities from each other;
   the outer surface of said driving coil for focusing lying opposite from the inner surface of said first magnet;
   half of the outer surface of said driving coil for tracking in the circumference direction lying opposite from the inner surface of said first magnet and another half lying opposite from the inner surface of said second magnet.

8. An objective lens driving apparatus comprising:
   a lens holder which supports an objective lens at a lens mounting portion;
   a support shaft which is inserted in a bearing hole formed on said lens holder;
   said lens holder being supported to be movable along said support shaft and to be rotatable around said support shaft;
   said lens holder is structured with a holder body which comprises said lens mounting portion and which is formed of a magnesium body; and
   the inner surface of said bearing hole being structured with contactingly movable material.

9. The objective lens driving apparatus according to claim 8 wherein said contactingly movable material is a resin.

10. The objective lens driving apparatus according to claim 8 wherein said lens holder comprises:
    said holder body; and
    a cylindrical bearing member which is engaged in a bearing mounting hole formed on said holder body and in which the inside wall is structured with contactingly movable material to form said bearing hole.

11. The objective lens driving apparatus according to claim 10 wherein the inside diameter of said bearing mounting hole is larger than the outside diameter of said bearing member.

12. The objective lens driving apparatus according to claim 10 wherein said bearing member is fixed to the inside of said bearing mounting hole by an adhesive.

13. A method of manufacturing an objective lens driving apparatus comprising:
    a lens holder which supports an objective lens at a lens mounting portion; and
    a support shaft which is inserted in a bearing hole formed on said lens holder;
    said lens holder including:
    a holder body which comprises said lens mounting portion and which is formed of a magnesium body; and
    a cylindrical bearing member which is engaged in a bearing mounting hole formed on said holder body and in which the inside wall is structured with contactingly movable material to form said bearing hole;
    said lens holder being supported to be movable along said support shaft and to be rotatable around said support shaft;
    an inside diameter of said bearing mounting hole being larger than an outside diameter of said cylindrical bearing member;
    said method comprising the steps of:
    when said lens holder is assembled by mounting said cylindrical bearing member onto the inside of said bearing mounting hole, adjusting the slant of said bearing member inside of said bearing mounting hole such that the axial line of said bearing hole and a reference surface for horizontal extension of said objective lens at said lens mounting portion are perpendicular to each other; and after the above adjusting step, fixing said bearing member onto the inside of said bearing mounting hole by an adhesive.

* * * * *